(12) United States Patent
Tiwari et al.

(10) Patent No.: US 10,731,630 B2
(45) Date of Patent: Aug. 4, 2020

(54) EXTENDED REACTION POWER FOR WIND FARMS

(71) Applicant: General Electric Company, Schenectady, NY (US)

(72) Inventors: Arvind Kumar Tiwari, Bangalore (IN); Rajni Kant Burra, Clifton Park, NY (US); Yashomani Y. Kolhatkar, Bangalore (IN); Harold Robert Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 15/861,063

(22) Filed: Jan. 3, 2018

(65) Prior Publication Data

US 2019/0203693 A1    Jul. 4, 2019

(51) Int. Cl.
*F03D 7/00* (2006.01)
*F03D 7/02* (2006.01)
(Continued)

(52) U.S. Cl.
CPC ......... *F03D 7/0288* (2013.01); *F03D 7/0272* (2013.01); *F03D 9/255* (2017.02);
(Continued)

(58) Field of Classification Search
CPC ......... F03D 7/0288; F03D 17/00; F03D 9/255
(Continued)

(56) References Cited

U.S. PATENT DOCUMENTS

| 5,198,744 A * | 3/1993 | Kohl | H02J 7/1438 322/33 |
|---|---|---|---|
| 6,492,801 B1 | 12/2002 | Sims et al. | |

(Continued)

FOREIGN PATENT DOCUMENTS

| EP | 3 118 783 A1 | 1/1917 |
|---|---|---|
| EP | 2 256 341 A1 | 12/2010 |

(Continued)

OTHER PUBLICATIONS

Jalili-Marandi et al., Real-Time Simulation of Grid-Connected Wind Farms Using Physical Aggregation, IEEE Transactions on Industrial Electronics, vol. 57, Issue 09, Sep. 2010, pp. 3010-3021. (Abstract Only).

(Continued)

*Primary Examiner* — Julio C. Gonzalez
(74) *Attorney, Agent, or Firm* — Dority & Manning, P.A.

(57) ABSTRACT

A control method for increasing reactive power generation of a wind turbine having a Doubly-Fed Induction Generator (DFIG) includes obtaining, by a control device having one or more processors and one or more memory devices, wind forecast data of the wind turbine. Further, the method includes generating, by the control device, a real-time thermal model of the DFIG of the wind turbine using the wind forecast data. More specifically, the thermal model defines a thermal capacity for the DFIG that does not exceed system limits. Thus, the method also includes dynamically adjusting, by the control device, a reactive power set point of the DFIG of the wind turbine based on the real-time thermal model.

16 Claims, 9 Drawing Sheets

(51) Int. Cl.
  *F03D 9/25* (2016.01)
  *F03D 17/00* (2016.01)
  *H02J 3/38* (2006.01)
  *H02J 3/18* (2006.01)
  *H02P 9/00* (2006.01)

(52) U.S. Cl.
  CPC .............. *F03D 17/00* (2016.05); *H02J 3/386* (2013.01); *F05B 2260/82* (2013.01); *F05B 2260/84* (2013.01); *F05B 2270/1033* (2013.01); *F05B 2270/3032* (2013.01); *H02J 3/18* (2013.01); *H02J 2203/20* (2020.01); *H02P 9/007* (2013.01)

(58) Field of Classification Search
  USPC ...................... 290/44, 55; 700/286–288, 291
  See application file for complete search history.

(56) References Cited

U.S. PATENT DOCUMENTS

| | | | |
|---|---|---|---|
| 8,569,904 | B2 | 10/2013 | Gundtoft et al. |
| 8,649,911 | B2* | 2/2014 | Avagliano ............... F03D 7/028 290/44 |
| 8,659,178 | B2 | 2/2014 | Gabeiras et al. |
| 9,587,626 | B2 | 3/2017 | Sadaba et al. |
| 9,605,653 | B2 | 3/2017 | Barker et al. |
| 2009/0121483 | A1 | 5/2009 | Xiong et al. |
| 2010/0100248 | A1 | 4/2010 | Minto et al. |
| 2010/0256829 | A1 | 10/2010 | Sadaba et al. |
| 2010/0270798 | A1* | 10/2010 | Poulsen ................ F03D 7/0224 290/44 |
| 2011/0106328 | A1* | 5/2011 | Zhou ..................... G05B 13/024 700/291 |
| 2011/0148114 | A1* | 6/2011 | Garcia .................... H02J 3/386 290/44 |
| 2012/0179301 | A1* | 7/2012 | Aivaliotis ................. H02J 3/00 700/286 |
| 2012/0306277 | A1 | 12/2012 | Garcia |
| 2013/0166082 | A1* | 6/2013 | Ambekar ............... G05B 13/04 700/287 |
| 2014/0103655 | A1* | 4/2014 | Burra ...................... F03D 7/028 290/44 |
| 2014/0229153 | A1 | 8/2014 | Grastein |
| 2014/0284926 | A1 | 9/2014 | Tirumalai et al. |
| 2015/0240784 | A1* | 8/2015 | Sagi ........................ F03D 7/048 700/287 |
| 2015/0308416 | A1 | 10/2015 | Ambekar et al. |
| 2016/0049792 | A1* | 2/2016 | Burra ................. G05B 19/0421 307/52 |
| 2016/0084224 | A1 | 3/2016 | Tyber et al. |
| 2017/0338652 | A1* | 11/2017 | Ubben ..................... H02J 3/18 |

FOREIGN PATENT DOCUMENTS

| | | |
|---|---|---|
| WO | WO2009003478 A3 | 1/2009 |
| WO | WO2016082837 A1 | 6/2016 |

OTHER PUBLICATIONS

Lei, et al., Modeling of the Wind Turbine With a Doubly Fed Induction Generator for Grid Integration Studies, IEEE Transactions on Energy Conversion, vol. 21, Issue 01, Mar. 2006, pp. 257-264. (Abstract Only).

Tapia, et al, Modeling and Control of a Wind Turbine Driven Doubly Fed Induction Generator, IEEE Transactions on Energy Conversion, vol. 18, Issue 2, Jun. 2003, pp. 194-204. (Abstract Only).

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages https://www.researchgate.net/publication/267966410.

EP Search Reþort, dated Jun. 14, 2019.

* cited by examiner

EXTENDED REACTION POWER FOR WIND FARMS

FIELD

The present disclosure relates generally to wind farms having a plurality of wind turbines, and more particular to systems and methods for extending the reactive power of wind farms.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity. In addition, a plurality of the wind turbines may be arranged in a predetermined geological location and electrically connected together to form a wind farm.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology.

The DFIG can be configured to provide both active or real power (measured in Watts) and reactive power (measured in VARs). For example, by controlling the rotor side converter, the real and reactive power generated by the stator can be controlled. Similarly, by controlling the line side converter, the real and reactive power generated by the line side converter can be controlled. Thus, the combined amount of reactive power generated by the DFIG wind turbine system can be controlled to meet a reactive power production requirement, such as a reactive power production requirement set by a dispatch control system of a utility company. In a typical configuration, the stator of a DFIG can be configured to supply the reactive power for the system unless the stator runs out of current margin, in which case, the line side converter can be used to help make reactive power to meet the reactive power production requirement.

In view of the foregoing, it would be advantageous to extend the reactive power capability of a wind farm to meet dynamic requirements.

BRIEF DESCRIPTION

Aspects and advantages of the invention will be set forth in part in the following description, or may be obvious from the description, or may be learned through practice of the invention.

In one aspect, the present disclosure is directed to a control method for increasing reactive power generation of a wind turbine. The wind turbine has a Doubly-Fed Induction Generator (DFIG). The control method includes obtaining, by a control device having one or more processors and one or more memory devices, wind forecast data of the wind turbine. Further, the method includes generating, by the control device, a real-time thermal model of the DFIG of the wind turbine using the wind forecast data. More specifically, the thermal model defines a thermal capacity for the DFIG of the wind turbine that does not exceed system limits defined by one or more wind turbine components, including but not limited to the DFIG, a power converter of the wind turbine cables, etc. Thus, the method also includes dynamically adjusting, by the control device, a reactive power set point of the DFIG of the wind turbine based on the real-time thermal model of the DFIG of the wind turbine In another aspect, the present disclosure is directed to a control system for a wind turbine. The wind turbine includes a Doubly-Fed Induction Generator (DFIG). The control system includes a control device having one or more processors and one or more memory devices. The control device is configured to perform one or more operations, including but not limited to obtaining wind forecast data and one or more active and/or reactive power production maps of the wind turbine, generating, via a physics-based model, a real-time thermal model of the DFIG of the wind turbine using the wind forecast data and the one or more active and/or reactive power production maps, the thermal model defining a thermal capacity for the DFIG of the wind turbine that does not exceed system limits, and dynamically adjusting a reactive power set point of the DFIG of the wind turbine based on the real-time thermal model.

Variations and modifications can be made to these example embodiments of the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, example aspects of the present disclosure are directed to systems and methods for increasing reactive power generation of one or more wind turbines in a wind farm. More specifically, with access to accurate wind forecasting data, the control device of the present disclosure generates a real-time thermal model of the electrical subsystem and estimates a thermal profile of different components of the DFIG, such as the stator and the rotor. Additionally, by changing the winding currents of the DFIG, the control device of the present disclosure is configured to estimate the time it takes electrical subsystem to reach its temperature limit in enhanced operating conditions. Thus, in the zone of needed additional reactive power, the stator and rotor current set point can be dynamically adjusted to extract additional reactive power. In addition, when wind turbines of a wind farm are arranged in clusters, each wind turbine or cluster can receive the reactive power set point reference with a record of operating history of connected wind turbines. Therefore, segmented VAR dispatch can be enabled without excessive electrical loading of individual wind turbines. Moreover, records of thermal cycling of the electrical subsystems are configured to provide additional inputs on the remaining life of each wind turbine.

Figure 1:
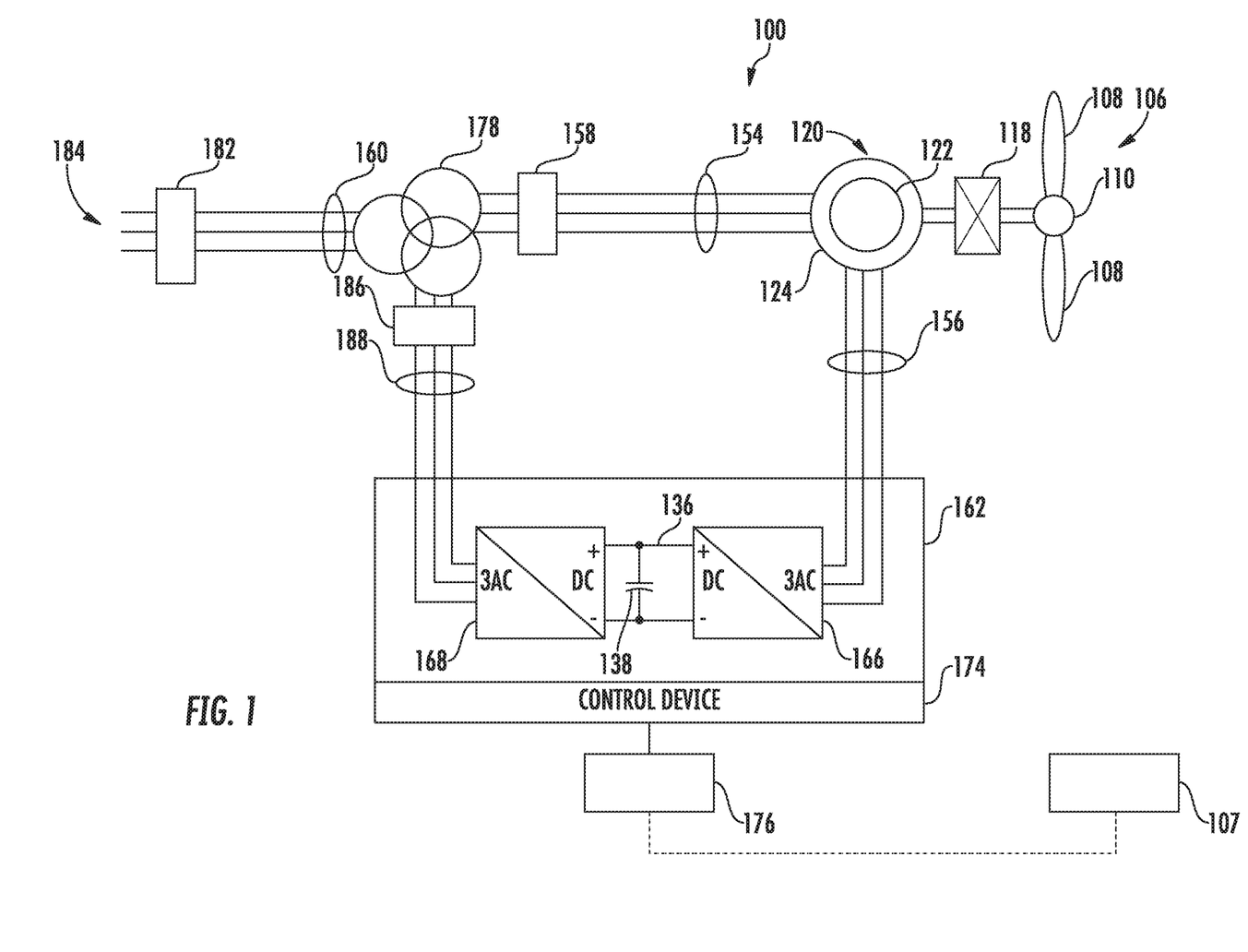
FIG. 1 illustrates a schematic diagram of one embodiment of a DFIG wind turbine system according to the present disclosure.

Referring now to the drawings, FIG. 1 illustrates one embodiment of a wind-driven DFIG wind turbine system 100 according to the present disclosure. Example aspects of the present disclosure are discussed with reference to the DFIG wind turbine system 100 of FIG. 1 for purposes of illustration and discussion. Those of ordinary skill in the art, using the disclosures provided herein, should understand that example aspects of the present disclosure are also applicable in other power systems, such as synchronous, asynchronous, permanent magnet, and full-power conversion wind turbines, solar, gas turbine, or other suitable power generation systems.

In the example system 100, a rotor 106 includes a plurality of rotor blades 108 coupled to a rotating hub 110. The rotor 106 is coupled to an optional gearbox 118, which is, in turn, coupled to a generator 120. In accordance with aspects of the present disclosure, the generator 120 is a doubly fed induction generator (DFIG) 120.

The DFIG 120 can include a rotor and a stator. Further, as shown, the DFIG 120 is typically coupled to a stator bus 154 and a power converter 162 via a rotor bus 156. The stator bus 154 provides an output multiphase power (e.g. three-phase power) from a stator of the DFIG 120 and the rotor bus 156 provides an output multiphase power (e.g. three-phase power) of a rotor of the DFIG 120. Referring to the power converter 162, the DFIG 120 is coupled via the rotor bus 156 to a rotor side converter 166. The rotor side converter 166 is coupled to a line side converter 168 which in turn is coupled to a line side bus 188.

In example configurations, the rotor side converter 166 and the line side converter 168 are configured for normal operating mode in a three-phase, pulse width modulation (PWM) arrangement using insulated gate bipolar transistor (IGBT) or similar switching elements. The rotor side converter 166 and the line side converter 168 can be coupled via a DC link 136 across which is the DC link capacitor 138. In an embodiment, a transformer 178, such as a three-winding transformer, can be coupled to the line bus 188, the stator bus 154, and a system bus 160. The transformer 178 can convert the voltage of power from the line bus 188 and the stator bus 154 to a voltage suitable for providing to an electrical grid 184 via system bus 160.

The power conversion system 162 can be coupled to a converter controller 174 to control the operation of the rotor side converter 166 and the line side converter 168. It should be noted that the converter controller 174, in typical embodiments, is configured as an interface between the power conversion system 162 and a turbine-level controller 176. In one implementation, the converter controller 174 can include a processing device (e.g. microprocessor, microcontroller, etc.) executing computer-readable instructions stored in a computer-readable medium. The instructions when executed by the processing device can cause the processing device to perform operations, including providing control commands (e.g. pulse width modulation commands) to the switching elements of the power converter 162 and other aspects of the wind turbine system 100.

In operation, alternating current power generated at the DFIG 120 by rotation of the rotor 106 is provided via a dual path to electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line side converter 168 converts the DC power on the DC link 136 into AC output power suitable for the electrical grid 184, such as AC power synchronous to the electrical grid 184, which can be transformed by the transformer 178 before being provided to the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz/60 Hz).

The power converter 162 can receive control signals from, for instance, the converter controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the converter controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Various circuit breakers and switches, such as a line bus breaker 186, stator bus breaker 158, and grid breaker 182 can be included in the system 100 to connect or disconnect corresponding buses, for example, when current flow is excessive and can damage components of the wind turbine system 100 or for other operational considerations. Additional protection components can also be included in the wind turbine system 100.

Figure 2:
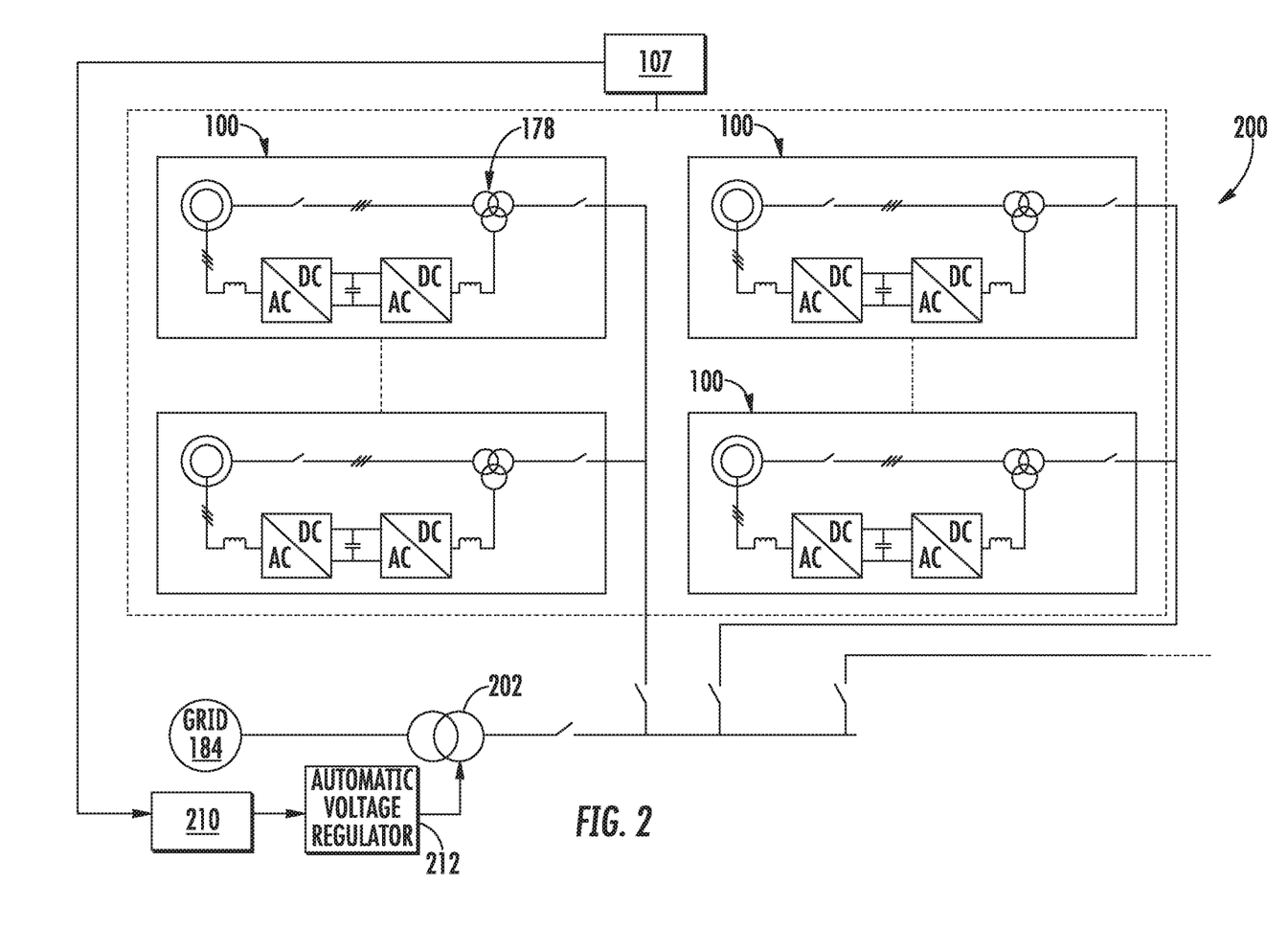
FIG. 2 illustrates a schematic diagram of one embodiment of a wind farm having a plurality of wind turbines according to the present disclosure.

Referring now to FIG. 2, the wind turbines 100 may be arranged together in a common geographical location known as a wind farm 200 and connected to the power grid 184. More specifically, as shown, each of the wind turbines 100 may be connected to the power grid 184 via a main transformer 178. Further, as shown, the clusters 206 of wind turbines 100 in the wind farm 200 may be connected to the power grid 184 via a cluster or substation transformer 202. Thus, as shown, the wind farm 200 may also include a transformer controller 210 and/or an automatic voltage regulator 212 (e.g. a tap changer).

Figure 3:
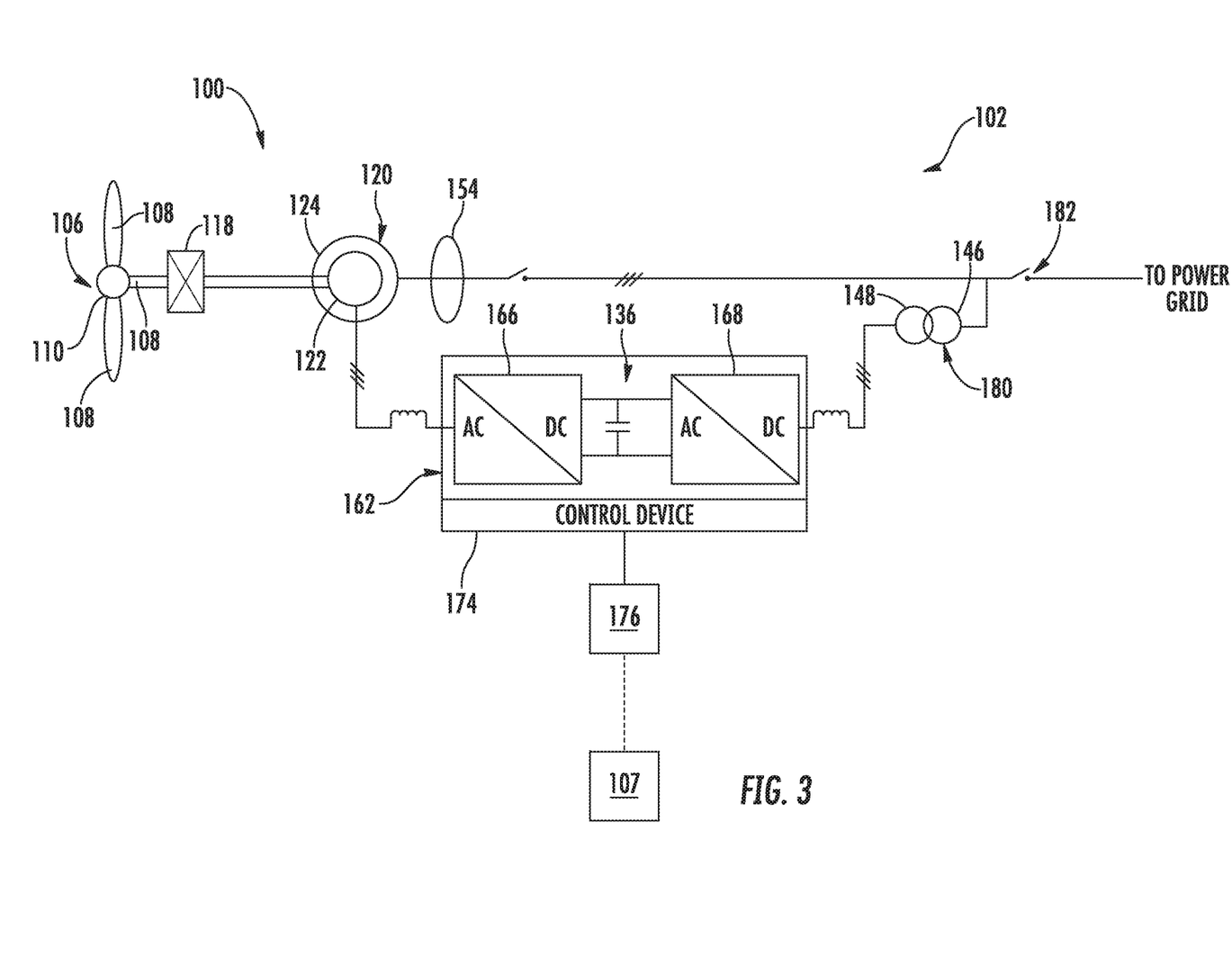
FIG. 3 illustrates a schematic diagram of another embodiment of a DFIG wind turbine system according to the present disclosure.
Figure 4:
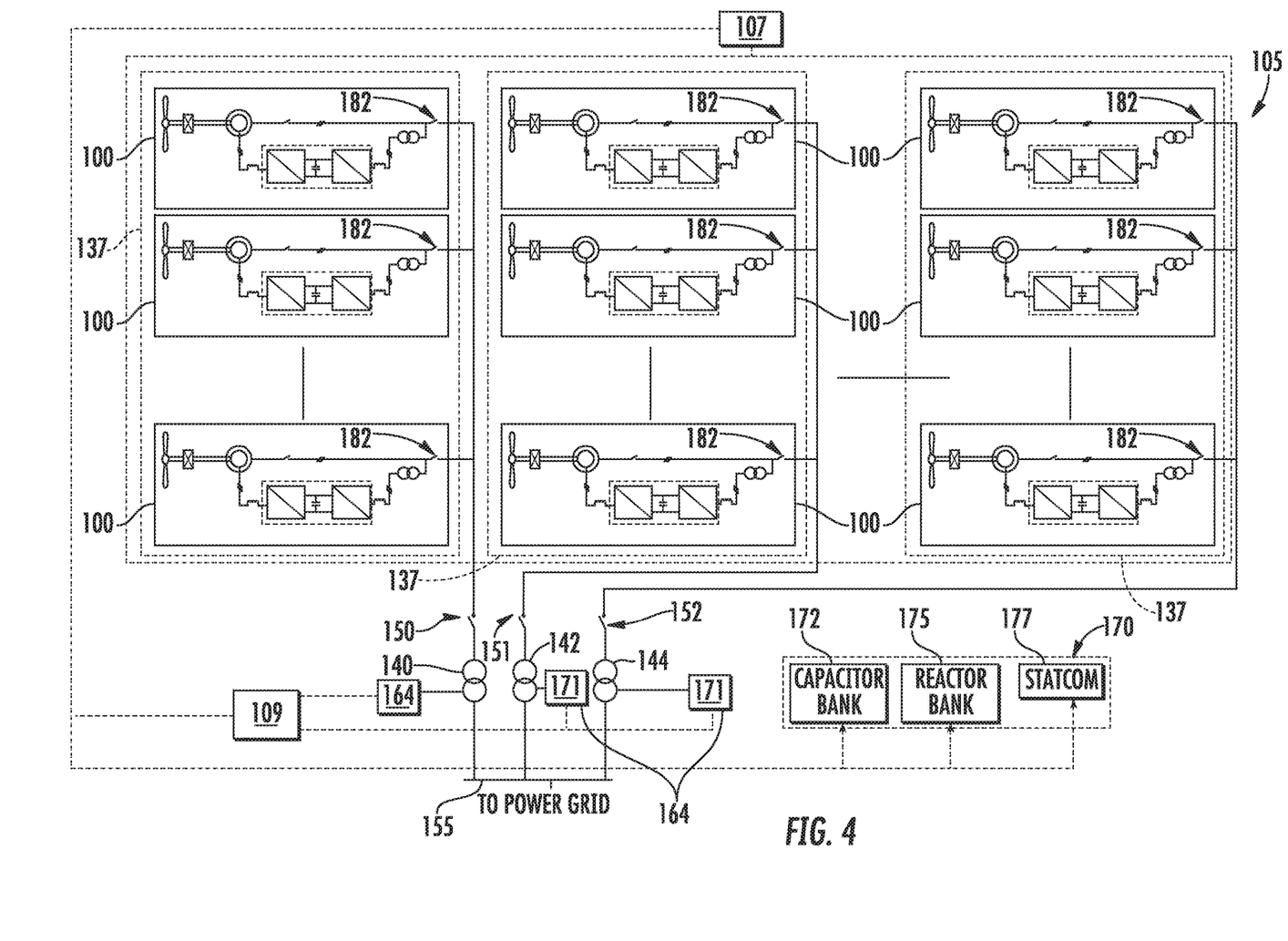
FIG. 4 illustrates a schematic diagram of another embodiment of a wind farm having a plurality of wind turbines according to the present disclosure.

Referring now to FIGS. 3 and 4, an alternate implementation of a DFIG wind turbine system 100 according to additional example aspects of the present disclosure is illustrated. Elements that are the same or similar to those as in FIG. 1 are referred to with the same reference numerals. As shown, in some implementations, a stator 124 of a DFIG 120 can be coupled to a stator bus 154. Power from the power converter 162 can be combined with power from stator bus 154 and provided to a transformer 180. In some implementations, as shown, the transformer 180 can be a two-winding partial transformer. In some implementations, as shown in FIG. 4, a plurality of the DFIG wind turbine systems 100 may be arranged together in a common geographical location known as a wind farm 105. Further, as shown, a plurality of the DFIG wind turbine systems 100 within the wind farm 105 can be coupled together in a cluster 137 and power from each of the respective clusters 137 of DFIG wind turbine systems 100 can be provided to a cluster transformer 140, 142, 144, respectively, before power is provided to the power grid. More specifically, as shown, each of the clusters 137 may be connected to the separate transformer 140, 142, 144 via switches 150, 151, 152, respectively, for stepping up the voltage amplitude of the electrical power from each cluster 137 such that the transformed electrical power may be further transmitted to the power grid.

In contrast to conventional systems such as those illustrated in FIGS. 1 and 2, the partial power transformer 180 of FIGS. 3 and 4 is provided for stepping up the voltage amplitude of the electrical power from the power converter 122 such that the transformed electrical power may be further transmitted to the power grid. Thus, as shown, the illustrated system 102 does not include the conventional three-winding main transformer described above. Rather, as shown in the illustrated embodiment, the partial power transformer 180 may correspond to a two-winding transformer having a primary winding 146 connected to the power grid and a secondary winding 148 connected to the rotor side converter 168.

In addition, as shown, the transformers 140, 142, 144 may be connected to a main line 155 that combines the voltage from each cluster 137 before sending the power to the grid. Further, as mentioned, each of the clusters 137 may be communicatively coupled with a cluster-level controller 109 that controls each of the transformers 140, 142, 144. In addition, as shown, the wind farm 105 may include one or more automatic voltage regulators (e.g. tap changers 164) arranged with each of the transformers 140, 142, 144 and/or one or more reactive power devices 170. For example, as shown, the reactive power devices 170 may include any one of the following: a capacitor bank 172, a reactor bank 175, and/or a static synchronous compensator (STATCOM) 177.

In addition, as shown, the wind turbine system 100 may include one or more controllers. For example, the system 100 may include a farm-level controller 107, one or more cluster-level controllers 109, and/or one or more turbine-level controllers 174, 176 (FIG. 3). such, the various controllers described herein are configured to control any of the components of the wind fame 105, the wind turbine clusters 137, and/or the individual wind turbines 100 and/or implement the method steps as described herein.

Figure 5:
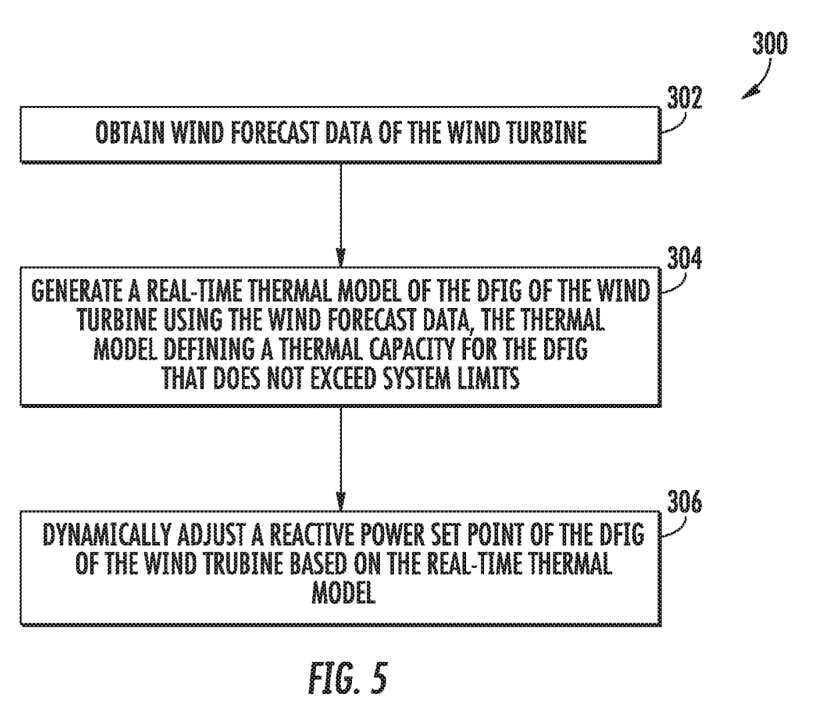
FIG. 5 illustrates a flow diagram of one embodiment of a method for increasing reactive power generation of a wind turbine according to the present disclosure.

Referring now to FIG. 5, a flow diagram of an example method 300 for increasing reactive power generation of one or more wind turbines 100 in the wind farm 105, 200 is illustrated. The method 300 can be implemented by a control device and/or control system, such as the converter controller 174 or the turbine-level controller 176 depicted in FIG. 1 or the control device/system 510 depicted in FIG. 10. In addition, FIG. 5 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

Figure 6:
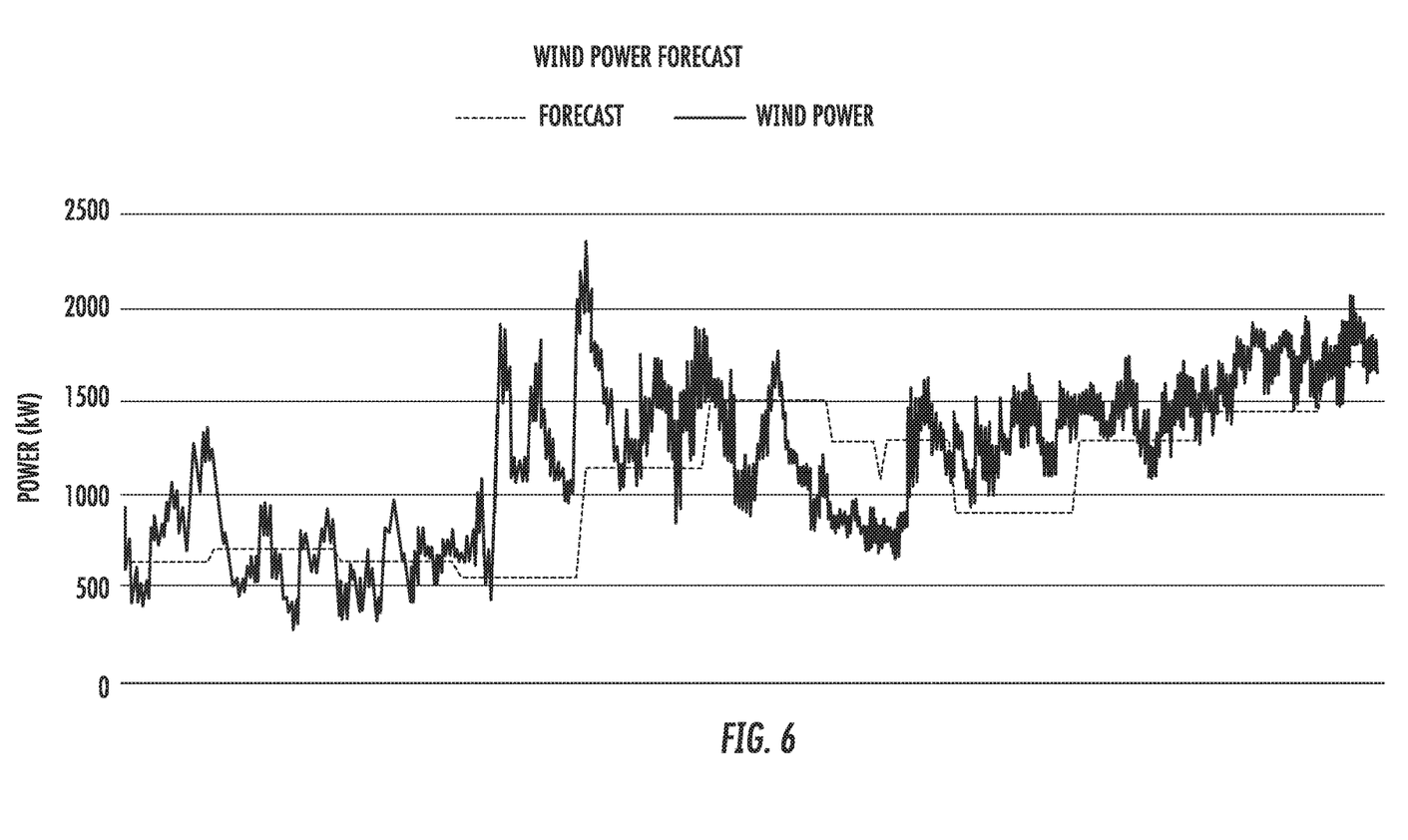
FIG. 6 illustrates a graph of wind forecast data of a wind turbine according to the present disclosure.

As shown at 302, the method 300 can include obtaining wind forecast data of the wind turbine(s) 100 by the control device 174. For example, as shown in FIG. 6, a graph of accurate wind forecast data 208 is illustrated. It should be understood that the wind forecast data may include data corresponding to wind speed, wind turbulence, wind gusts, wind direction, wind acceleration, wind shear, wind veer, wake, or any other wind parameter. Further, the control device 174 can be operatively connected to one or more sensors, such as one or more wind sensors, and can be configured to receive measurements indicative of various wind conditions in the wind farm 200 that can be used to estimate the wind forecast data. In addition, the step of obtaining the wind forecast data of the wind turbine 100 may further include calibrating estimated patterns of wind data with actual measured wind data and predicting the wind forecast data based on the calibrations.

Referring back to FIG. 5, as shown at 304, the method 300 can include generating a real-time thermal model of the DFIG 120 of the wind turbine 100 using the wind forecast data 208. For example, in one embodiment, the control device 174 may generate the real-time thermal model of the DFIG 120 of the wind turbine 100 using a physics-based model. As used herein, a physics-based model generally refers to a mathematical representation of an object (or its behavior) that incorporates physical characteristics such as forces, torques, and energies into the model, allowing numerical simulation of its behavior. Thus, physics-based models can be used to generate and visualize constrained shapes, motions of rigid and non-rigid objects, and object interactions with the environment. In further embodiments, the method 300 may also include assuming the wind forecast data is correct and continuously calibrating the digital model with an actual physical model of the wind turbine 100.

As used herein, the thermal model defines a thermal capacity for the DFIG 120 that does not exceed system limits. For example, in certain embodiments, the system limit(s) described herein may include an electrical limitation of a component of one of the wind turbines 100 (e.g. voltage, current, etc.), a sizing limitation of a component of one of the wind turbines 100 (transformer size, power cabling size, protective sizing, etc.), VAR gain, a predefined reactive power capability, or predefined a real power capability. In another embodiment, the method 300 may also include estimating a thermal profile of one or more generator components of the DFIG 120 based on the at least one real-time thermal model. For example, in certain embodiments, the generator component(s) of the DFIG 120 may include the rotor 122, the stator 124, or any other generator component. Further, in certain embodiments, the method 300 may further include obtaining one or more active and/or reactive power production maps of the wind turbine 100 and generating the real-time thermal model of the DFIG 120 of the wind turbine 100 using the wind forecast data 208 and the one or more power production maps. Thus, coupled electro-thermal models can provide insight of the thermal gradient of the DFIG 120.

In further embodiments, the method 300 may also include changing one or more winding currents of the DFIG 120 to get an estimate of the time taken by the DFIG 120 to reach a temperature limit. Thus, in such embodiments, the control device 174 may incorporate the time taken by the DFIG 120 to reach the temperature limit into the thermal model.

In several embodiments, the method 300 may also include monitoring a cyclic nature of wind at the wind turbine 100. As such, the method 300 may further include determining an estimate of the thermal cycling of the wind turbine 100 based on the cyclic nature of the wind. Thus, using the physics-based model, the control device 174 may determine a remaining life of the DFIG 120 based on the thermal cycling.

In additional embodiments, the method 300 may further include incorporating a generator unbalance voltage state into the physics-based model and determining how the generator unbalance voltage state affects a temperature rise of the DFIG 120. The unbalance in generator voltage can result in increased negative sequence current which can result in additional loss and heating up of the DFIG 120.

Figure 7:
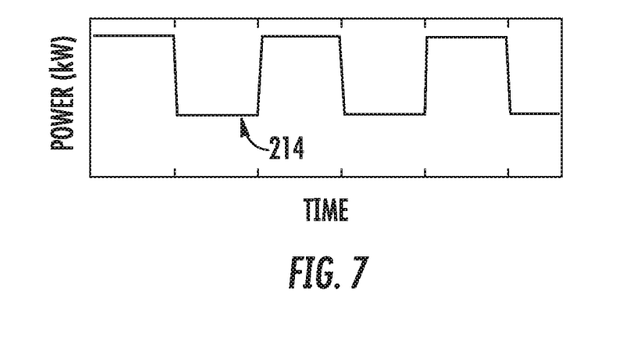
FIG. 7 illustrates a graph of the reactive power set point of a generator of a wind turbine according to the present disclosure.
Figure 8:
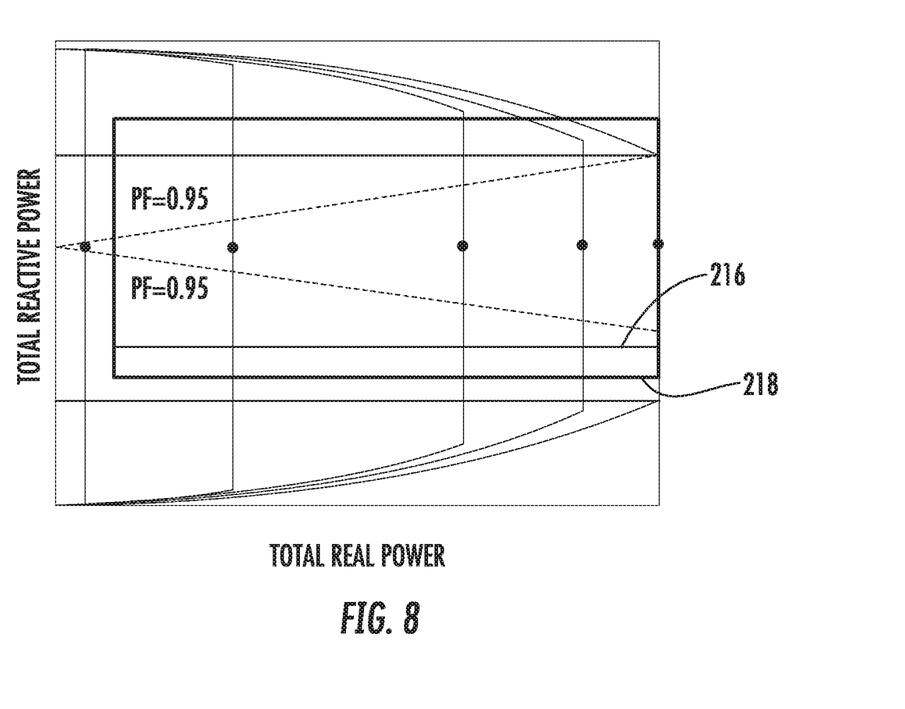
FIG. 8 illustrates a graph of the total reactive power (y-axis) versus total real power (x-axis) of a wind turbine according to the present disclosure.

Referring still to FIG. 5, as shown at 306, the method 300 can include dynamically adjusting a reactive power set point of the DFIG 120 of the wind turbine 100 based, at least in part, on the real-time thermal model. For example, as shown in FIG. 7 the control device 174 is configured to adjust the reactive power set point 214 (e.g. by increasing or decreasing the reactive power set point) over time based on the real-time thermal model. Thus, as shown in FIG. 8, the method 300 of the present disclosure extends the reactive power capability of the wind turbine(s) 100 (and therefore the wind farm 105, 200 where applicable). More specifically, as shown, box 216 represents the reactive power of prior art wind turbines, whereas box 218 represents the reactive power of wind turbines operated in accordance with the present disclosure.

In further embodiments, where the wind turbine 100 is part of a cluster 137 of the wind farm 105 (FIG. 4), the method 300 may include evaluating the wind forecast data 208 in at least one of the clusters 137 of wind turbines 100 in the wind farm 105, selecting a first wind turbine 100 with remaining reactive power capability using the wind forecast data 208 from the cluster 137, and changing a reactive power set point of the first wind turbine for a first predetermined time duration. In another embodiment, the method 300 may also include selecting, at least, a second wind turbine having remaining reactive power capability using the wind forecast data 208 and changing a reactive power set point of the second wind turbine for a second predetermined time duration that occurs after the first predetermined time duration.

Figure 9:
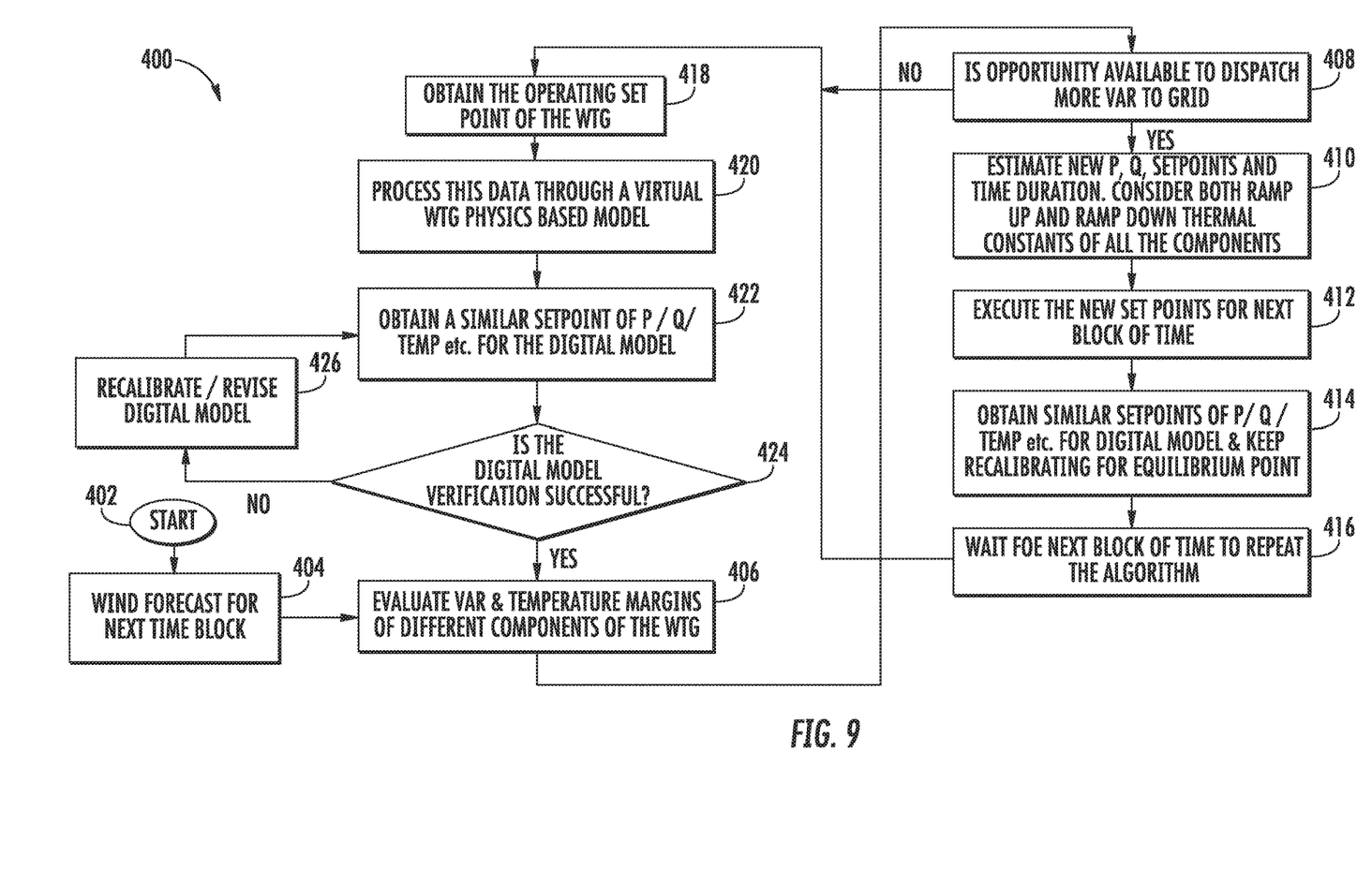
FIG. 9 illustrates a flow diagram of another embodiment of a method for increasing reactive power generation of a wind turbine according to the present disclosure.

Referring now to FIG. 9, a flow chart of another embodiment of a method 400 for increasing reactive power generation of one or more wind turbines 100 in the wind farm 105, 200 according to the present disclosure is illustrated. As shown, the method 400 starts at 402. At 404, the method 400 includes receiving wind forecast data for the next time block. As shown at 406, the method 400 then evaluates the reactive power (VAR) and temperature margins of various wind turbine components of the wind turbines 100 (WTGs). As shown at 408, the method 400 determines whether there is an opportunity available to dispatch more VARs to the grid. If so, as shown at 410, the method 400 then estimates new reactive and active power set points as well as a new time duration and considers both ramp up and ramp down thermal constants for the wind turbine components. As shown at 412, the method 400 then executes or sends the new set points for the next block of time. As shown at 414, the method 400 obtains similar set points for active and reactive power (and temperature) for the digital model and continues recalibrating for the equilibrium point. As shown at 416, the method 400 waits for the next block of time to repeat the algorithm again.

Going back to block 408, if there is no opportunity to dispatch more VAR to the grid, as shown at 418, the method 400 obtains the operating set point for the wind turbine power system(s) 100. As shown at 420, the method 400 then processes this data through the physics-based digital model. As shown at 422, the method 400 obtains a similar set point for reactive and active power (an optionally temperature) for the digital model. As shown at 424, the method 400 can then determine whether the digital model verification is successful. If yes, then the method 400 returns to block 406. If not, then method 400 recalibrates and/or revises the digital model.

Figure 10:
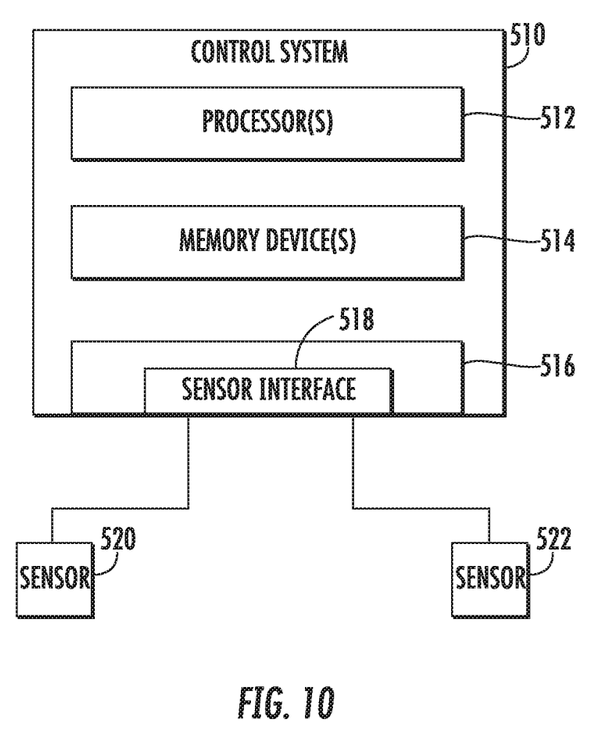
FIG. 10 illustrates a schematic diagram of one embodiment of a control device of a wind turbine according to the present disclosure.

FIG. 10 illustrates an example control device/system 510 according to example embodiments of the present disclosure. The control device/system 510 can be, for example, a converter controller 174 or the turbine-level controller 176, and can be associated with an individual wind turbine system, a wind farm (e.g., a cluster-level or farm-level control device) and/or can include one or more control devices associated with aspects of a wind turbine system, such as one or more control devices configured to control a power converter 162. In some embodiments, the one or more control devices 510 can include one or more processor(s) 512 and one or more memory device(s) 514. The processor (s) 512 and memory device(s) 514 can be distributed so that they are located at one more locales or with different devices.

The processor(s) 512 and memory device(s) 514 can be configured to perform a variety of computer-implemented functions and/or instructions (e.g., performing the methods, steps, calculations and the like and storing relevant data as disclosed herein). The instructions when executed by the processor(s) 512 can cause the processor(s) 512 to perform operations according to example aspects of the present disclosure. For instance, the instructions when executed by the processor(s) 512 can cause the processor(s) 512 to implement the methods discussed herein.

Additionally, the control device 510 can include a communication interface 516 to facilitate communications between the control device 510 and various components of a wind turbine system, wind farm, or power system, including reactive power production requirements or sensed operating parameters as described herein. Further, the communication interface 518 can include a sensor interface 518 (e.g., one or more analog-to-digital converters) to permit signals transmitted from one or more sensors 520, 522 to be converted into signals that can be understood and processed by the processor(s) 512. It should be appreciated that the sensors (e.g. sensors 520, 522) can be communicatively coupled to the communications interface 518 using any suitable means, such as a wired or wireless connection. The signals can be communicated using any suitable communications protocol. The sensors (520, 522) can be, for example, voltage sensors, current sensors, power sensors, DFIG rotational speed sensors, temperature sensors, or any other sensor device described herein.

As such, the processor(s) 512 can be configured to receive one or more signals from the sensors 520, 522. For instance, in some embodiments, the processor(s) 512 can receive signals indicative of a voltage or current from the sensor 520. In some embodiments, the processor(s) 512 can receive signals indicative of temperature (e.g. DFIG temperature, line side converter temperature) from sensor 522.

As used herein, the term "processor" refers not only to integrated circuits referred to in the art as being included in a computer, but also refers to a control device, a microcontrol device, a microcomputer, a programmable logic control device (PLC), an application specific integrated circuit, and other programmable circuits. Additionally, the memory device(s) 514 can generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 514 can generally be configured to store suitable computer-readable instructions that, when implemented by the processor(s) 512, configure the control device 510 to perform the various functions as described herein.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A control method for increasing reactive power generation of a wind turbine, the wind turbine having a Doubly-Fed Induction Generator (DFIG), the control method comprising:
   predicting, by a control device having one or more processors and one or more memory devices, wind forecast data of the wind turbine;
   estimating, via a physics-based model, a thermal profile of one or more generator components of the DFIG of the wind turbine using the wind forecast data of the wind turbine, the thermal profile defining a temperature margin for the one or more generator components of the DFIG that does not exceed system limits; and,
   dynamically adjusting, by the control device, a reactive power set point of the DFIG of the wind turbine based on the temperature margin and further estimating a time taken by the DFIG to reach a temperature limit by changing one or more winding currents of the DFIG.

2. The control method of claim 1, further comprising a power output of the wind turbine and generating the temperature margin of the DFIG of the wind turbine using the wind forecast data and the power output.

3. The control method of claim 1, wherein the one or more generator components of the DFIG comprises at least one of a rotor or a stator.

4. The control method of claim 1, further comprising:
   monitoring a cyclic nature of wind at the wind turbine;
   determining an estimate of thermal cycling of the wind turbine based on the cyclic nature of the wind; and,
   determining, via the physics-based model, a remaining life of the DFIG based on the thermal cycling.

5. The control method of claim 1, further comprising incorporating a generator unbalance voltage state into the physics-based model and determining how the generator unbalance voltage state effects a temperature rise of the DFIG.

6. The control method of claim 1, wherein obtaining the wind forecast data of the wind turbine further comprises calibrating estimated patterns of wind data with actual measured wind data.

7. The control method of claim 1, wherein the wind turbine is part of a wind farm comprising a plurality of clusters of wind turbines.

8. The control method of claim 7, further comprising:
evaluating wind forecast data in at least one of the plurality of clusters of wind turbines in the wind farm;
using the wind forecast data from the cluster, selecting a first wind turbine with remaining reactive power capability; and,
changing the reactive power set point of the first wind turbine for a first predetermined time duration.

9. The control method of claim 8, further comprising, using the wind forecast data from the cluster, selecting at least a second wind turbine having remaining reactive power capability and changing the reactive power set point of the second wind turbine for a second predetermined time duration that occurs after the first predetermined time duration.

10. A control system for a wind turbine, the wind turbine having a Doubly-Fed Induction Generator (DFIG), the control system comprising:
a control device comprising one or more processors and one or more memory devices, the control device configured to perform one or more operations, the one or more operations comprising:
predicting wind forecast data and a power output of the wind turbine;
estimating, via a physics-based model, a thermal profile of one or more generator components of the DFIG of the wind turbine using the wind forecast data and the power output, the thermal profile defining a temperature margin for the one or more generator components of the DFIG that does not exceed system limits; and,
dynamically adjusting a reactive power set point of the DFIG of the wind turbine based on the temperature margin and further estimating a time taken by the DFIG to reach a temperature limit by changing one or more winding currents of the DFIG.

11. The control system of claim 10, wherein the one or more generator components of the DFIG comprising at least one of a rotor or a stator.

12. The control system of claim 10, further comprising:
monitoring a cyclic nature of wind at the wind turbine;
determining an estimate of thermal cycling of the wind turbine based on the cyclic nature of the wind; and,
determining, via the physics-based model, a remaining life of the DFIG based on the thermal cycling.

13. The control system of claim 10, wherein obtaining the wind forecast data of the wind turbine further comprises calibrating estimated patterns of wind data with actual measured wind data.

14. The control system of claim 10, wherein the wind turbine is part of a wind farm comprising a plurality of clusters of wind turbines.

15. The control system of claim 14, wherein the one or more operations further comprise:
evaluating wind forecast data in at least one of the plurality of clusters of wind turbines in the wind farm;
using the wind forecast data from the cluster, selecting a first wind turbine with remaining reactive power capability; and,
changing the reactive power set point of the first wind turbine for a first predetermined time duration.

16. The control system of claim 15, wherein the one or more operations further comprise:
using the wind forecast data from the cluster, selecting at least a second wind turbine having remaining reactive power capability; and
changing the reactive power set point of the second wind turbine for a second predetermined time duration that occurs after the first predetermined time duration.

* * * * *